United States Patent [19]
Jones et al.

[11] 4,363,458
[45] Dec. 14, 1982

[54] AIRFOIL STRUCTURE

[76] Inventors: Andrew W. Jones, 16 Saxon Rd., Cambridge CB5 8HS, England; Raymond Merry, 18 Orkney Close, Haverhill, Suffolk, both of England

[21] Appl. No.: 170,109

[22] Filed: Jul. 18, 1980

[30] Foreign Application Priority Data

Jul. 19, 1979 [GB] United Kingdom ............... 25158

[51] Int. Cl.³ .................. B64C 31/06; B64D 17/02
[52] U.S. Cl. ......................... 244/153 R; 244/145; 244/DIG. 1
[58] Field of Search ............ 244/142, 145, 146, 152, 244/153 R, 154, 155 A, DIG. 1

[56] References Cited
U.S. PATENT DOCUMENTS 4,129,272  12/1978  Jones et al. .................. 244/152
4,198,019  4/1980  Linezmajer ................ 244/DIG. 1

Primary Examiner—Charles E. Frankfort
Attorney, Agent, or Firm—Jenkins, Coffey, Hyland, Badger & Conard

[57] ABSTRACT

An airfoil structure including an elongate hollow container which, in use provides an airfoil cross-section between the longer edge regions of the container. A space is provided for so stiffening the leading edge region, that when the structure is in use the end regions of the container are permitted to deform out of the plane of the remainder of the width of the container - while this remaining part of the container width is kept substantially undeformed.

10 Claims, 13 Drawing Figures

AIRFOIL STRUCTURE

BACKGROUND OF THE INVENTION

This invention relates to aerofoil structures.

In particular the present invention is concerned with such structures when utilised for example controlled flight operation; such as tethered flight (an example of such use being use as a kite); as a means for lifting a load; as a prime mover for towing land or water going craft or vehicles, or as an energy conversion means.

A particular form of aerofoil structure contemplated by the present invention is one which can be used as a kite which is required to be flown under continuously controllable conditions in which the user is able to adjust the position of the kite relative to the horizon and/or azimuth as desired.

THE PRIOR ART

In our U.S. Pat. No. 4,129,272 we have disclosed an air inflatable aerofoil structure including a wing-like container or envelope having an aerofoil cross section the structure being formed of a flexible material and which is intended to be inflated by ram air during use, therebeing a spar holding the container or envelope in a spread out condition in which it can be inflated by ram air.

The ends of the spar provides anchorage points for two control lines by which the kite can be controlled in flight.

With this known kite structure it was found that, even though the flight performance and characteristics of the kite were highly exceptional and unique as compared with other kites incorporating inflatable containers, the performance and handling characteristics, had performance gaps or regions in the overall spectrum of flight performance - which rendered the structure unstable flightwise under certain wind conditions.

For example, using the kite in steady winds, it was noticable that a minimum wind speed of some five knots was, in practical terms essential. Also, in gusty wind conditions it was noticeable that a degree of instability could occur which seriously interfered with the flight and control of the kite to such an extent that whilst a highly experienced "kite-flyer" could frequently, by his experience and skill handle the kite, that is, overcome the inherent instability conditions, others such as children or novices and those whose physical reactions to a visual sign that a stability condition change was about to arise - could not respond sufficiently quickly enough to take the requisite corrective action, whereupon the kite entered into an uncontrollable decent.

Thus, whilst the structure gave rise to essentially new techniques of use in relation to inflatable body aerofoil structures i.e. kites - the aerodynamic characteristics of the kite were such that, as has been mentioned, the overall flight performance and handling characteristics involved undesirable deficiencies under certain conditions.

With a view to eliminating such deficiencies from the flight characteristics of the kite, careful investigations involving wind tunnels and flight tests were carried out to establish the cause of the deficiencies without reducing or otherwise spoiling the desirable and acceptable features of the hitherto available flight characteristics.

SUMMARIES OF THE INVENTION

In accordance with the invention there is provided an aerofoil structure including an aerofoil structure including an elongate main-body capable of providing an aerofoil cross-section between the longer edge regions thereof and deformable stiffening means so co-operable with the main body as to extend lengthwise thereof, the stiffening means being such that during use of the structure the end regions are able to deflect relative to the remainder of the main body.

In a preferred construction the deformation is such that a line passing co-axially of said remainder when the stiffening means is in the condition of full deflection is inclined at an angle greater than 45° to a line co-axial with either of the tip regions of the stiffening means.

Preferably the angle between these lines lies within the range 60° to 90°, with a preferred value being nearer to the upper end of the range, i.e. 70°–90°.

In a preferred arrangement construction of the stiffening means is such that when the aerofoil structure used as a kite and when the main body is in its flight attitude, the major part of the aerofoil forming surfaces thereof are maintained substantially perpendicular to the flight lines, and such that each of the end regions of the main body is so positioned at an angle with respect to said major part that the primary lift forces on the main body are caused to act parallel to the flight lines.

Preferably, the stiffening means is formed by a spar arrangement having a stepped or multi-angle tapered formation which is selected such as to provide for differential deformation characteristics along the length thereof.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 1:
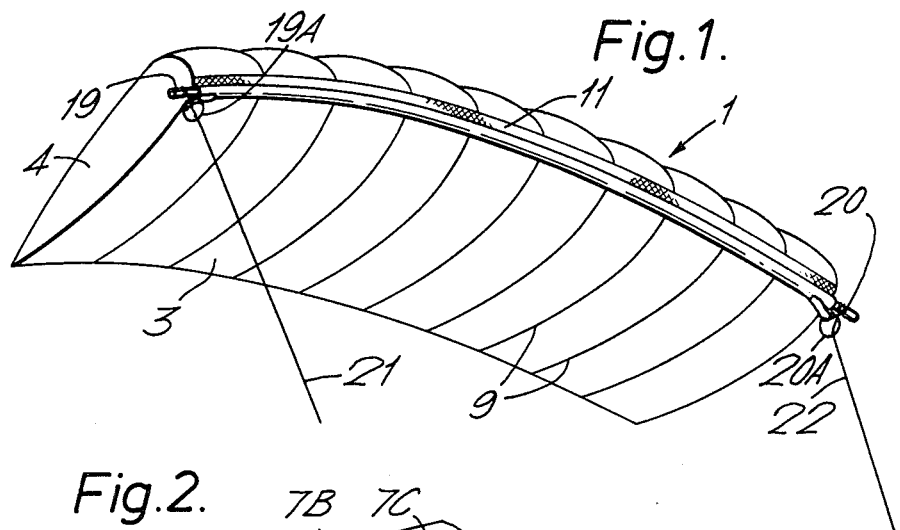
FIG. 1 is a perspective view of an aerofoil structure of the known construction and when forming a kite, the Figure showing take-off flight attitude, that is when structure is undeformed.
Figure 2:
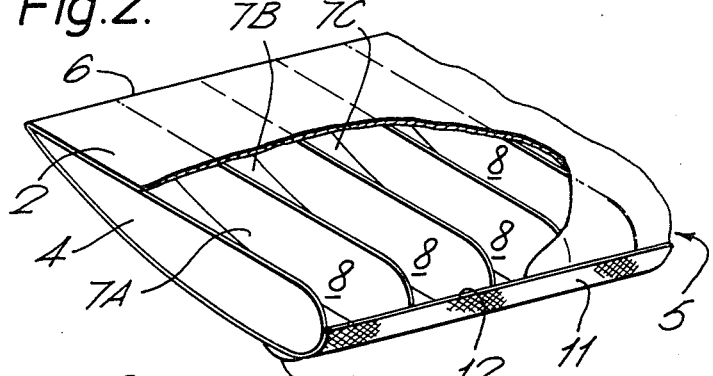
FIG. 2 is a fragmentary cut-away view of the structure of FIG. 1 when inflated.
Figure 3:
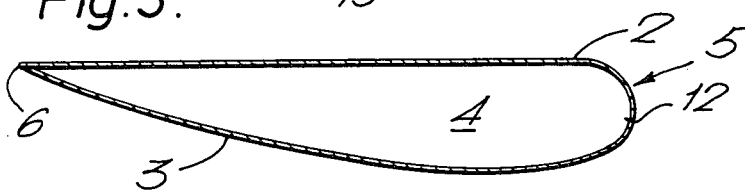
FIG. 3 is a view illustrating the particular aerofoil used in the structure of FIGS. 1 and 2.
Figure 4:
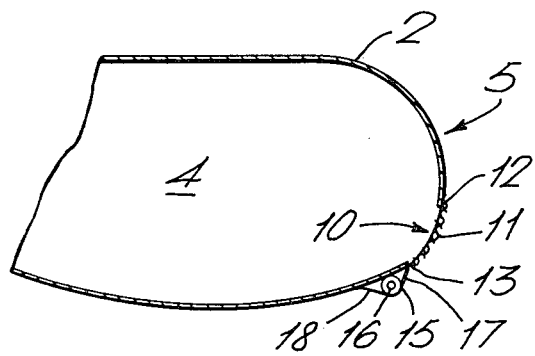
FIG. 4 is a fragmentary side view of the structure.

Referring to FIG. 1-7 of the drawings a flexible air inflatable structure 1 serving as a wing formation includes a generally rectangular top sheet or skin 2, a bottom sheet or skin 3 and at the ends thereof end walls 4 having a shape forming the aerofoil type secton shown in FIG. 3.

The top and bottom sheets are connected along their longer edges 5 and 6 to provide the leading and trailing edges of the structure, and along their shorter edges to the walls 4.

The mode of connection used can be in any convenient manner, such as for example, by stitching, by heat welding, by adhesives, by various combinations of the foregoing or other convenient methods.

The material from which the top and bottom sheets and the end walls are formed has to be flexible, non-stretchable and also impervious to air. One such material is known as "Rip Stop Spinnaker Nylon (RTM)" this material having a substantial resistance to the tearing effect of wind forces. When the sheets and walls are stitched Polyester thread is a suitable sewing material.

On securing the top and bottom sheets and the end walls a hollow envelope or container is formed which provides a ram air fillable structure when in use.

The interior of the container is sub-divided into separate compartments 7A, 7B, 7C ... etc., by internal walls 8 having the same aerofoil shape as the walls 4. The walls 8 are secured to the sheets 2 and 3 by any of the above mentioned method. In a practical structure of a kite in which the overall dimensions were 1830 mm × 620 mm the structure was divided into ten compartments by nine of the walls 8. The positions of the walls 8 are indicated by stitch lines 9.

A generally rectangular opening 10 for the inflating ram air is provided along the whole length of the leading edge 5 of the top sheet 2 to enable simultaneous admission of air to all of the compartments 7A, 7B, 7C ... etc., The opening 10 is effectively defined by a gauze or other net-like material strip 11 whose upper longitudinal edge 12 is secured to the top edge of the opening 10 and whose lower longitudinal edge 13 is similarly secured to the leading edge of the bottom sheet 3. The ends of the strip 11 are secured to the end walls 4.

A pocket or sleeve 15 for receiving a flexible spar 16 is provided along the leading edge of the sheet 3. The sleeve 15 has a leading edge 17 and a trailing edge 18 and is attached to the underside of the bottom sheet 3. Alternatively, the leading edge region of the bottom sheet can be turned back to provide material for the sleeve.

Figure 5:
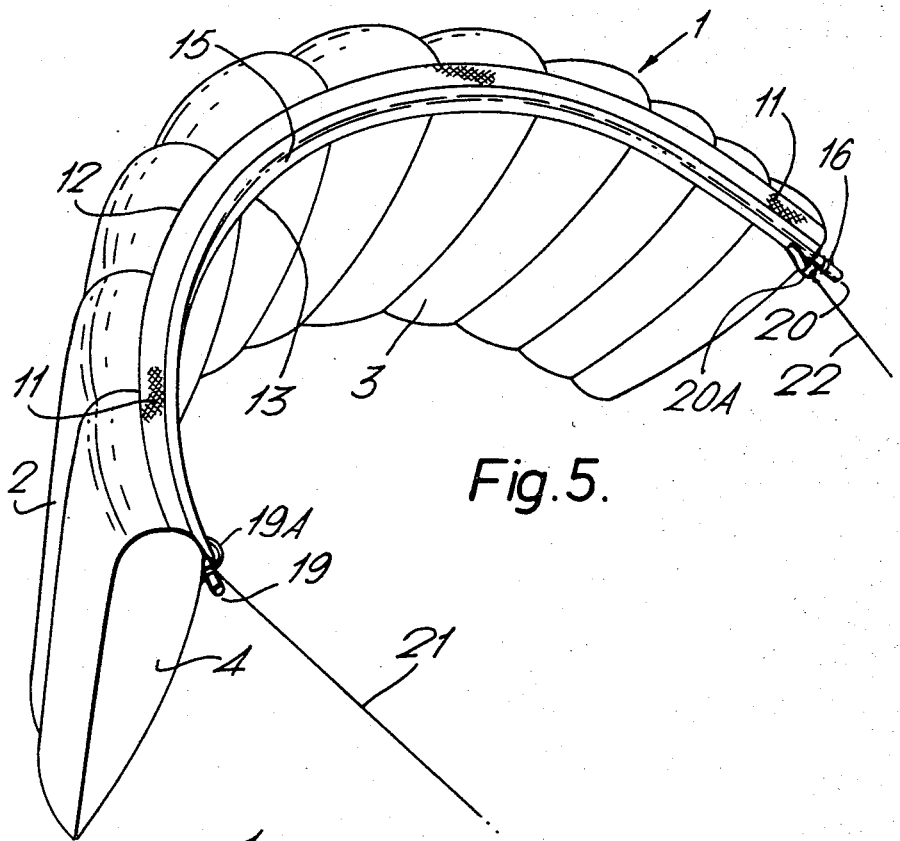
FIG. 5 is a perspective side view of the structure of the previous Figures, the structure being shown when in a flight attitude characteristic of high wind velocities.
Figure 6:
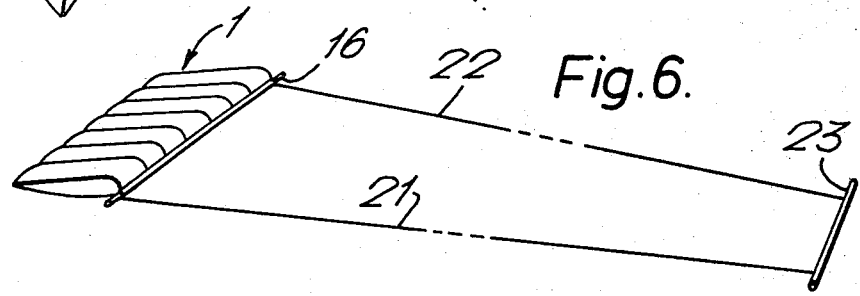
FIG. 6 is a schematic perspective view of an aerofoil structure when flying in relatively low wind velocities.
Figure 7:
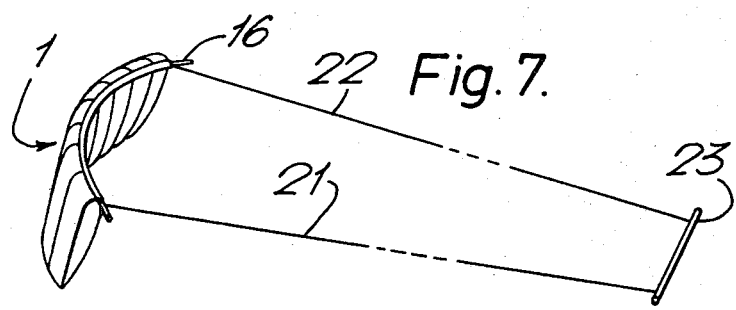
FIG. 7 is a schematic perspective view of the structure when flying in relatively high wind velocities.

The spar is formed from a material providing a high degree of flexibility and which is light in weight. The spar is hollow and is formed from glass or carbon fibre. For a structure of the dimensions mentioned the spar dismantles into two sections. Each section is such so that the spar always deforms into a smooth continuously curved form when in flight. This smooth continuously curved form is shown in FIG. 5 and can be regarded as being of a generally parabolic form.

The spar length is such that the spar ends 19, 20 project from the structure 1 to enable attachment of control lines 21,22 to the spar ends and to ensure that the spar ends cannot foul the adjacent portions of the sheets 2 and 3. In addition, ring-like means 20A are provided at the leading edge corners of the envelope for engagement by the lines 20,21 so that on fitting the spar the envelope corners can be positionally located with respect to the spar. The other ends of the control lines 21, 22 are connected to a control bar 23 which is hand held by the user of the structure.

It is convenient to regard the structure as a multi-cell arrangement which comprises a series of side-by-side compartments 7A, 7B ... which define a series of funnels or wind-sock like formations into which the ram air enters through the strip 11 thereby to 'blow-up' the individual compartments and thus provide the structure with sufficient rigidity i.e. a state of stiffness, for the aerodynamic properties of the aerofoil formation to be presented by the inflated structure to oncoming wind that is maintaining the inflation.

The above discussed construction with its continuously curved flight profile exhibits the undesirable features mentioned above.

Referring now to FIGS. 8 to 11, these figures are concerned with an aerofoil structure which overcomes the above discussed difficulties and which exhibits a structure of the present invention.

For convenience in bringing out the subtle and basically highly technical differences between the structure of the present invention and the Applicant's previously proposed kite structure it is proposed to discuss the structure of the invention in terms of a kite and to use wherever possible the same reference numerals as has been used in FIGS. 1-7 for those components of the structure which have counter-parts in the FIGS. 1 to 7 arrangement.

Figure 8:
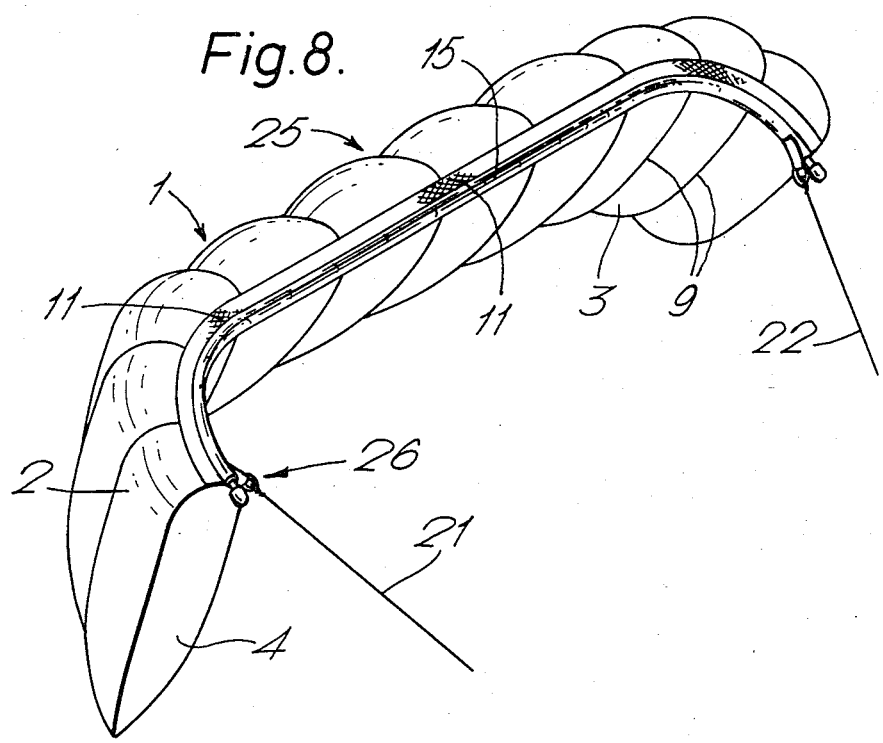
FIG. 8 is a perspective view of the aerofoil structure when incorporating the features of the present invention, the structure being shown in a position similar to that of FIG. 5.

In fact FIGS. 5 and 8 have been drawn respectively to illustrate a known Kite (FIG. 5) when in its flight attitude and a kite structure (FIG. 8) incorporating the features of the present invention and also in its flight attitude.

The construction in general terms of the container 1 is similar to that of FIGS. 1 to 7 in that it includes top and bottom sheets 2,3; end walls 4; leading and trailing edges 5,6; compartments 7A,7B,7C ... etc., dividing walls 8, stitch lines 9; the opening 10; the net-like strip 11; edges 12,13; pocket or sleeve 15; edges 12 and 13 tabs and rings 20A. In view of such similarity further description is not thought necessary.

A comparison of the structure of FIG. 8 with that of FIG. 5 will show that the shape or profile of the Figure when in the tilted flight attitude is completely different from that adopted by the FIG. 5 structure. This feature is a highly crucial feature of the wind tunnel tested structure of the present invention and is an important factor in the improved and enhanced flight performance achieved.

As has been mentioned the kite shape of FIG. 5 is essentially a continuously smoothly curved parabolic shape that is a shape with a very highly pronounced continuous curvature with a varying rate of change in the radius of curvature in the central regions. As compared with the FIG. 5 situation, the structure of FIG. 8 is one in which the structure is essentially rectilinear over the major part of its length so that the structure can be regarded as being wholly undeformed through out the greater part of the length of the structure with only relatively short end regions not in line with the central regions of the structure.

Considering the flight profile of the structure shown in FIGS. 5 and 8 from a further aspect it can be said that the FIG. 5 wing structure, when in flight assumes a smoothly curved leading edge profile—without any abrupt discontinuities, whereas that of FIG. 8 has a generally flat or straight central region with a very large radius of curvature to all intents and purposes substantially infinite terminating at each end region abrupt corner which produces generally downwardly directed side wall or flap region; this corner having a small radius of curvature.

This particular shaping has been found to enhance the flight characteristics of the structure as compared with the characteristics associated with the structure of the FIG. 5 arrangement.

Figure 9:
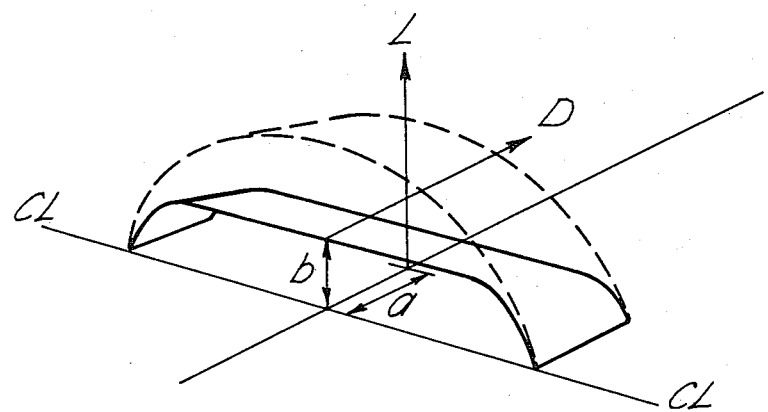
FIG. 9 is a schematic sketch illustrating the theoretical relationships between lift and drag.

The significance of the FIG. 8 profile as compared with that of FIG. 5 will be briefly considered in relation to FIG. 9 which schematically shows a kite envelope when its flight setting or profile with the ends of the spar defining effectively through the points of connection of the tethering or control lines 21,22 with the spar a line CL—CL.

The forces acting upon the structure can be conveniently regarded as a lift force acting upon the centre of the wing formation at a distance 'a' from the line CL—CL, this force having a moment 'L'×'a' about the line CL—CL; and a drag force D acting at a distance 'b' from the line CL—CL and producing a moment about the line CL—CL of 'D'×'b'. During flight this latter moment has desirably to balance the moment of the lift forces. In other words the moments 'L'×'a' has to equal 'D'×'b'.

If it is regarded that the dashed line representation of FIG. 9 represents the FIG. 5 arrangement it will be noted that the distance 'b' for individual drag force elements at various locations along the length of the envelope will be very variable along the length of the line CL—CL, so that the various moments of lift form a variable factor across the width of the envelope 1. It will also be apparent that the actual lift force will, other than at the actual midpoint of the envelope, have outwardly directed lateral components which effectively reduce the actual useful lift and thus the pull exerted in the lines 21 and 22. Thus in the case of the parabolic shape of FIG. 5 a substantial amount of the possible lift induced is wasted.

The full line representation is that relating to FIG. 8. It will be noted that distance 'b' is substantially constant.

In the case of the FIG. 5 arrangement numerous tests and evaluations in connection therewith have shown that the consequence of the large deflections of the envelope is that the distance 'b' is always such that the Drag moment is greater than the Lift moment so that the drag forces have always tended to over displace the leading edge of the structure rearwardly relative to the vertical plane through the line CL—CL whereby the angle of attack (that between the plane of the centre portion of the envelope and the plane of the incoming airstream is not at its optimum value). This condition results in undue increase in the drag forces and in consequence an undesired aerodynamic movement towards stall conditions in relatively high wind speed conditions. Furthermore, as has been mentioned this high speed stall factor is accompanied by relatively poor flight response in wind speeds of low values such as four knots and less.

In practice it has been found that a simple smoothing of the parabolic shape of FIG. 5 i.e. reducing nearer to a straight line whilst appearing to provide a solution to the drag moment factor and also to reduce the extent of the lateral force components because of the reduction of the distance 'b' the Drag force moment is not sufficient to move the wing structure when in flight to an angle of attack which is high enough to create acceptable lift forces.

Lengthy tests have demonstrated that the retention of the fully curved profile maintains a situation in which one cannot reduce the Drag moment without introducing a highly undesirable adverse change in the Lift moment; that is failure to retain the level of the overall lift.

These difficulties have, in accordance with the features of the invention, been effectively overcome by providing a spar or like means which so controls the deflection or curvature of the leading edge that it has the profile generally shown in FIG. 8.

Figure 10:
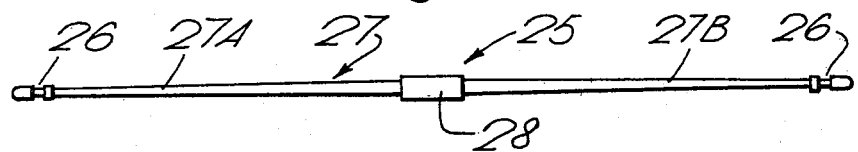
FIG. 10 illustrates a stiffening means when in an undeformed condition, and for use with the structure of FIG. 8.
Figure 10A:
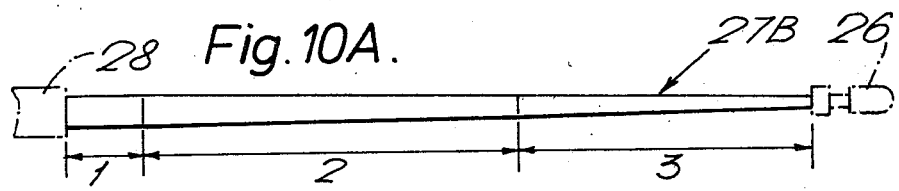
FIG. 10A illustrates to an enlarged scale a detail of FIG. 10.
Figure 11:
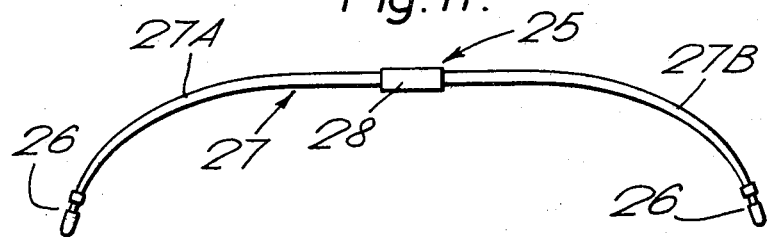
FIG. 11 illustrates the stiffening means of FIG. 10 when in a deformed condition, FIG. 12, schematically shows a further spar construction.

Thus, as has been above mentioned, the leading edge region of the envelope is so controlled in terms of deflection that the distance 'b' remains substantially constant over the major part of the width of the wing structure. As mentioned this is shown in full lines in FIG. 9. With this feature the drag force moment for a particular drag is reduced with the resulting reduction in the variation of the value of drag moment distance b. In other words since the major length of the wing structure is substantially undeflected the structure is effectively approximating, in a flexible structure, the conditions produced by a rigid structure such as an aircraft wing with downwardly directed wing tip dihedral. FIGS. 10, 10A and 11 illustrate an embodiment of a spar construction providing the required flight profile. FIG. 10 illustrates the spar in its undeformed condition and FIG. 11 shows the spar when it is in its fully deformed condition.

As will be seen from these Figures the spar tapers from the central region 25 towards either end tip region 26. In the Figures, the enlargement at the centre of the spar is a ferrule 28 which serves to connect the two parts of a two parts 27A and 27B of a two spar 27.

The tapering of the spar is not a steady taper but is such that the rate of taper varies along the length of the spar. Thus the spar can be stepped or a gradually changing tapering which is capable of defining the desired bend profile. This is schematically shown in FIG. 10A in which the right hand side 27B is shown to have distinct taper parts A, B and C. In the embodiment shown the dimensions of each half of the spar can be defined in terms of the change in diameter of the spar per unit length in relation to the percentage length of the spar as measured from the central region thereof in the direction to the tip region.

The following tabulation provides an indication of the variation for a particular spar construction and is intended to provide an indication of the nature of the profiling of the spar shown in the figures.

| PERCENTAGE LENGTH FROM CENTRE TO TIP | | | DIAMETER REDUCTION PER UNIT LENGTH |
|---|---|---|---|
| 0 | 13.1 | (Section 1) | ZERO TAPER |
| 13.1 | 43.7 | (Section 2) | 0.00 43 |
| 43.7 | 100 | (Section 3) | 0.0054 |

The diameter of the spar at the centre is, as a percentage of the total length, is 0.437%.

As can be seen from FIG. 10 the above tapering produces a flight profile in which the major length of the spar remains relatively undeformed as compared with a generally parabolic shape spar deformation having the same separation between the tips 26A, when in the deformed state. Wind tunnel tests have shown that a simple tapering of the spar cannot provide the requisite deformation profile but merely provides the smoothly curved profile which it is important to eliminate. Thus in connection with a single taper spar formation, it has been found that, as has been mentioned the deformation is too great for the drag, lift, and angle of attack relationship, whereby by increasing the dimensions overall to correct the relationship for the optimum aerodynamic result, the spar weight becomes excessively great. In practice, it has been found that the flight performance is seriously impaired, particularly on launching and low wind speed flight.

With a view to facilitating the change of flight profile it has been found convenient to modify, as compared with the structures of United States Patent, the formation of the upper and lower sheets 2,3 in such manner as effectively to build-in a curved shape into the end regions of the envelope so that its uninflated shape generally conforms to the flight shape. With this feature, stretching of the upper sheet member 2 or the corresponding crumpling of the lower sheet member 3 is avoided. By reducing the crumpling or creasing at the leading edge region of the aerofoil structure improved air flow conditions are produced which assist in reducing the drag, and improving the lift. With the utilisation of the flight profile, according to the present invention, it has been found advantageous to arrange that the aspect ratio that is the envelope span to chord width to chord length of the aerofoil structure should be in excess of 3 with a preferred value of 3.5 for a wing formation having a 2300 mm span.

In addition, it is important to ensure that the aerofoil shape is maintained throughout the full length of the span and particularly at the turned down end regions.

It is, therefore, desirable to maintain the spacing between the internal walls or chord (8) within the range 0.20 to 0.35×riser chord length.

In view of the substantially abrupt change in the leading edge region profile, it is important to ensure that ram air is able to enter the cells 7 in the vicinity of the deformation region. It has been found desirable to arrange for the mesh of the ram air inlet to be such that in use it can always assume a parallelogram form which has been found to ensure that the gauze is still open to allow ingress of air.

In a modified structure the spar can be formed from three sections in which the central section—which provides the essentially flat portion, is formed as a non deformable section, which can be slightly permanently profiled to a desired form.

A flexible spar section is provided at each end region of the spar central section, the free ends of these flexible sections provide the spreading anchorages for the container or envelope and also for the control line, and are of such resiliency that during the launching, the end sections form substantially rectilinear extensions of the central section, and such that during flight they deform to produce the downwardly directed end sections—similar to those of FIGS. 8 to 10.

Figure 12:
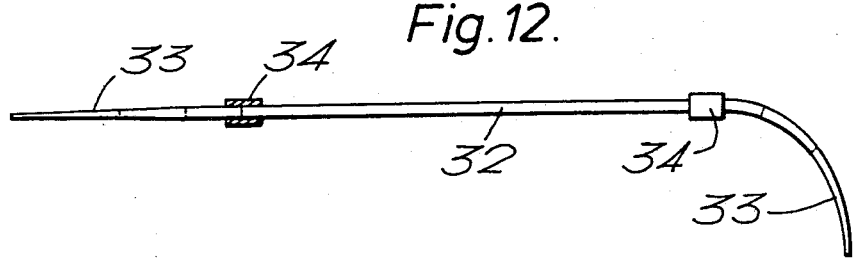

A possible construction using the three sections is shown in FIG. 12. In this Figure the spar is shown at one end in non flight setting and at the other end in its flight setting.

The deformation of the spar is such that said end regions are inclined at an angle greater than 45° to a line extending lengthwise of the leading edge region of the container leading edge region. Preferably the angle lies within 60°–90° and more preferably 75° to 90°.

In the FIG. 12, 32 represents the centre section, the 33, the end sections, and 34 the ferrules or the like which will connect the sections.

It will be understood that whilst the above has mentioned that the structure can be used as a hand held kite it will be understood that by attaching the lines to a boat the pull exerted in the lines 21,22 can be used to provide pull for pulling the boat. Such could, for example augment motor driven propellor drive.

We claim:

1. An air-inflatable airfoil structure, comprising an elongate container having elongate leading and trailing edge regions, said structure being formed so as to provide an airfoil cross section between the leading and trailing edge regions when the container is inflated, elongate stiffening means connected to the leading edge region to maintain the container in an extended condition, said stiffening means further including at each end an anchorage for one of a pair of control lines for the structure, said stiffening means being constructed so that the deformation characteristics of said stiffening means permit a considerably higher degree of deformation at the end region of said stiffening means than at the central region of the stiffening means, said stiffening means comprising a spar having a substantially rigid center section extending along a substantial portion of the central region of the leading edge of said airfoil structure and serving to keep the central region substantially undeformed during flight of the structure, a connector at either end of said center section, and a substantially deformable end section connected to each said connector.

2. The invention of claim 1 wherein the deformation is such that a line passing colinearly of the central region of the leading edge region when the stiffening means is in its condition of full deflection is inclined at an angle greater than 45° to a line colinear with the tip portion of the end regions of the stiffening means.

3. The invention of claim 2 wherein the angle lies in the range of 60°–90°.

4. The invention of claim 2 wherein the angle lies in the range of 75°–90°.

5. The invention of claim 1 and further comprising at least one control line connected to each anchorage, and wherein the construction of the spar is such that when the wing structure is in its flight attitude, the major part of the airfoil surface along the length of the surface is maintained substantially perpendicular to the control lines, and is also such that the end regions of the airfoil surface are positioned at oblique angles with respect to said control lines, the combined arrangement being such that when in flight, primary lift forces acting upon the structure are caused to act in directions substantially parallel to the control lines.

6. An air-inflatable airfoil structure, comprising an elongate main body formed by an inflatable hollow container having first and second longer edge regions, said container being shaped to provide an airfoil cross section between the first and second longer edge regions, and wherein said first longer edge region is shaped to provide an aerodynamic leading edge formation having ram air inlet arrangements extending along the leading edge formation, an elongate stiffening means cooperating with the leading edge region at a location beneath the ram air inlet arrangements, the stiffening means being deformable when the structure is in flight to define a shape to the structure which is such that the major portion of the body along the direction of the aerodynamic leading edge remains substantially undeformed, whilst the end regions of the stiffening means are turned through an arcuate angle greater than 45° to the direction of the longer edges of said major portion, and a pair of lines secured respectively one to each end region of the elongate stiffening means, said stiffening means comprising a spar having a stepwise tapered formation, the stepping of which is such as to provide for the deformation characteristics along the length of the stiffening means.

7. The invention of claim 6 wherein the spar has two halves, and wherein each half has three taper parts, and wherein the change in diameter per unit length is less in the section of the spar half nearest the center of the spar than it is in the middle section of the spar half, and wherein the diameter change per unit length is less in the middle section of the spar half than it is in the end section of the spar half.

8. The invention of claim 6 wherein the lines are control lines.

9. The invention of claim 6 wherein the lines are teathering lines.

10. The invention of claim 6 wherein the lines are carrying lines.

* * * * *